Dec. 1, 1931.   R. W. THOMAS   1,834,480

WINDLASS

Filed Feb. 14, 1930

INVENTOR.
Rosswell W. Thomas

BY *Lancaster, Allwine and Rommel*
ATTORNEYS.

Patented Dec. 1, 1931

1,834,480

UNITED STATES PATENT OFFICE

ROSSWELL W. THOMAS, OF DETROIT, MICHIGAN, ASSIGNOR TO PHILLIPS PETROLEUM COMPANY, OF BARTLESVILLE, OKLAHOMA, A CORPORATION

WINDLASS

Application filed February 14, 1930. Serial No. 428,504.

This invention relates to improvements in windlass mechanisms.

The primary object of this invention is the provision of an improved windlass which has been specifically constructed for use in connection with weighing mechanism in the relation set forth in my co-pending application, Serial No. 428,502, filed Feb. 14, 1930, and which is very compact and manually operable for expeditious extension or winding of the supporting cable thereon; of few and economically assembled parts; and particularly well constructed for best directing the forces incident to a load into the beam or scales of the weighing mechanism.

Other objects and advantages of this invention will be apparent during the course of the following detailed description.

In the drawings, wherein for the purpose of illustration is shown only a preferred embodiment of the invention, Figure 1 is a side elevation of the improved windlass showing the position which the same assumes when supported upon suitable weighing mechanism.

Figure 1:
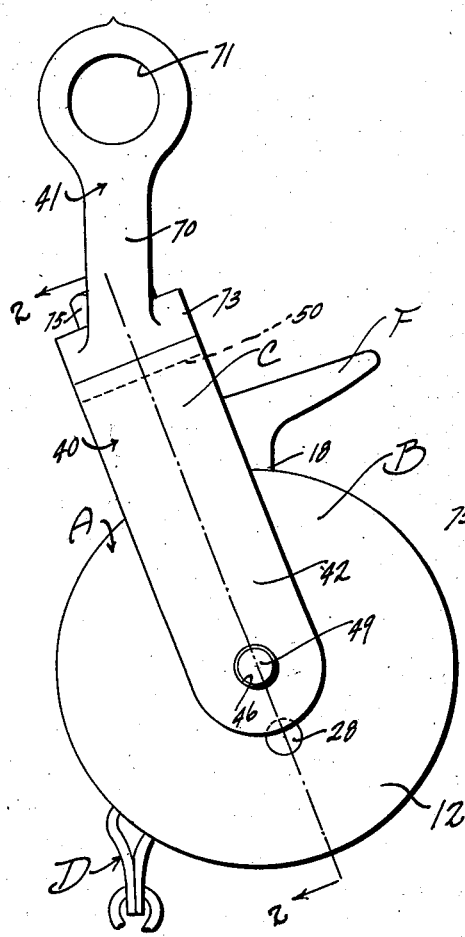

In the drawings, wherein similar reference characters designate corresponding parts throughout the several views, the letter A may generally designate the windlass, which may include a drum or pulley B rotatably supported in an improved yoke or frame C. A cable D, preferably of the chain type, is supported for winding and unwinding with respect to the drum B; the latter having a pawl F operating over an annular series of ratchet teeth.

The drum B is in the form of a deep groove pulley comprising the hub portion 10 having an axial passageway 11 therethrough. Relatively thin but wide flanges, measured radially of the hub, designated at 12 and 13, are provided at opposite ends of the hub 10, defining a groove 14 annularly about the hub wherein the chain or cable D is adapted to be received as it is spirally wound upon the hub. These flanges 12 and 13, at their outer peripheries, are fashioned to each perform an additional function other than that of guiding the winding and unwinding of the chain; the flange 12 being knurled at 16 to serve as a hand wheel for enabling the facile rotation of the drum B. The other flange 13 is provided with an annular series of ratchet teeth 17 thereon, provided with pawl cooperating shoulders formed radially of the drum, against which the detent 18 of the pawl F cooperates as will be subsequently described.

Figure 2:
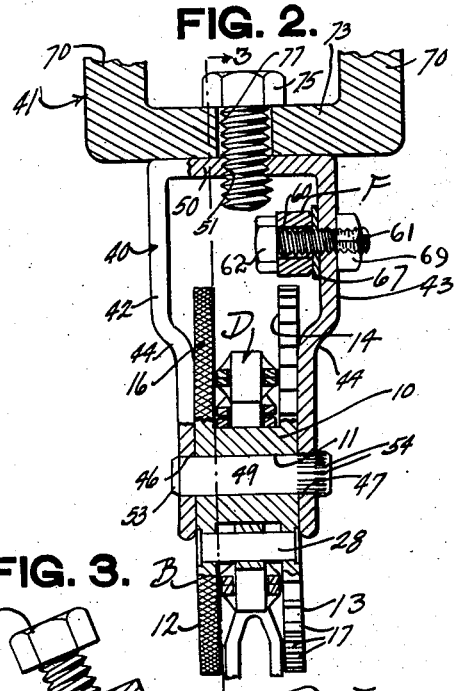
Figure 2 is a fragmentary sectional view taken through details of the improved windless substantially on the line 2—2 of Figure 1.

The chain or cable D may be of any approved flexible character, sufficient for the purpose for which the windlass is to be used. It is preferably a chain, comprising a plurality of links 25, suitably swiveled or otherwise connected together. The link at the end of the chain D nearest the hub 10 is connected to the drum upon a pin 28 which is transversely supported across the groove of the drum D near the hub 10, as by connection in suitable apertures provided in the flanges 12 and 13, as shown in Figure 2. It is quite apparent that upon rotation of the drum B the chain D may be wound or unwound with respect to the drum, within groove 14 thereof. The chain or cable D at its outer end is provided with a hook or coupling member 30, which in the present instance comprises a U-shaped hook swivelly connected in an opening 31 of a triangular connection 33 forming the outermost link of the chain D. Any other type of coupling than that shown at 30 may be provided if desired.

The yoke or frame C for rotatably supporting the pulley B preferably comprises an elongate lower inverted U-shaped yoke portion 40, and an elongate upper portion 41 detachably connected therewith with their longitudinal axes in obtuse angular relation, for properly supporting the pulley B with respect to attachment of the upper frame portion 41 with a support. The yoke portion 40 comprises the spaced legs 42 and 43, which are close together at their lower ends, and offset at 44 intermediate their ends to farther space the upper ends thereof. The lower closed ends are apertured at 46 and 47 respectively, and are adapted to receive an improved axle or bearing 49 for rotatably supporting the drum B between the legs 42 and 43, as shown in the drawings. The upper ends of the legs 42 and 43 are connected together by the horizontal bight portion 50, which is provided with a screw threaded opening 51 therethrough.

Figure 4:
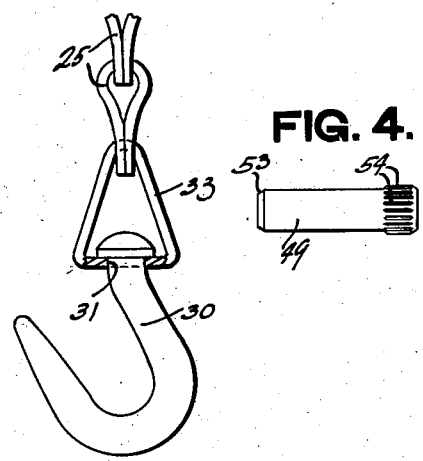
Figure 4 is a detail of an improved type of axle or bearing for rotatably supporting the drum of the windlass.

The pivot pin or bearing 49, as shown in Figure 4, is slightly tapered in reduced relation at one end 53 and at its opposite end it is provided circumferentially thereabout with longitudinal grooves 54 extending a short distance along the pin; the grooves 54 being cut into the material of the axle or pin 49 and thus raising the intermediate portions between the grooves 54 beyond the normal circumferential surface of the pin. The pin 49 is inserted at its tapered end 54 within the opening 47 of the leg 43 of the yoke 40, and extended through the opening 11 of the hub of the pulley C. Its end adjacent the taper 53 will seat snugly in the opening 46 of the leg 42 of the yoke 40, and by force the grooved end of the pin or axle 49 is driven into the opening 47, to wedge-fit the same therein, as shown in Figure 2; thus effectively keying the pin or axle in position upon the yoke 40 and forming a bearing for support of the pulley or drum B, as can readily be understood.

Figure 3:
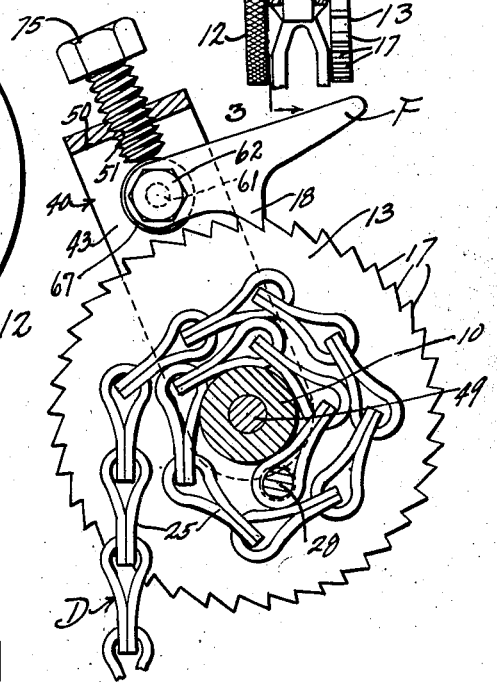
Figure 3 is a fragmentary sectional view taken through the improved windlass, substantially on the line 3—3 of Figure 2, but showing the upper portion of the supporting yoke of the windlass removed.

The pawl F is shown in Figures 2 and 3 of the drawings, being provided at one end with an opening 60, which receives the shank 61 of a supporting pin or bolt 62 therethrough; the latter being carried on the upper end of the leg 43 of the yoke 40; above the drum B. The head of the bolt 62 lies internally of the leg 43, with the shank 61 threaded into the leg 43. A washer 67 fits against the leg 43 and next the pawl F is slipped upon the shank in the manner described, and a nut 69 is then adjusted on the outer screw threaded end of the bolt 62 to hold the pawl F in a pivotal position upon the bolt 62, thus locking the bolt 62 from rotation and providing proper clearance for free movement of the pawl F. This connection of the pawl on the pin or bolt 62 is free and not screw threaded nor sufficiently tight to prevent the facile lifting and lowering of the pawl with respect to the teeth 17 of the drum B. The pawl F extends substantially normal to the plane of the yoke 40, projecting beyond an edge thereof so that an operator may freely grasp the same for elevating or lowering the pawl end 18 thereof. The detent 18 is in position to normally engage the ratchet teeth 17 of the drum B; the pawl F resting by gravity in this relation upon the drum B, from which position it may be lifted by a finger of an operator to release the detent from the ratchet teeth and enable a rotation of the drum in either direction.

The upper yoke portion 41 of the frame structure C comprises a pair of supporting arms 70, in parallel relation, apertured at 71 at the upper end thereof and adapted to receive a pivot pin by means of which to connect the improved windlass upon a balance beam of suitable weighing scales, as set forth in my application above referred to. These arms 70 at their lower ends are connected by a bar-like cross portion 73, of rectangular cross section, disposed in a plane at an acute angle to the axis of each of the arms 70. The lower yoke 40 is adapted to abut against the under-surface of the cross portion 73 of the upper yoke 41, and it is connected rigidly therewith by means of a bolt 75, the shank of which extends through an opening 77 in the cross portion 73 and through the screw threaded opening 51 above mentioned, as shown in Figure 2. The upper yoke portion 41 is disposed with its longitudinal axis approximately tangential to the drum B, so that the lower depending portion of the cable D will hang in substantial alignment with the longitudinal axis of the upper frame portion 41 and, so that the frame will support the pulley B in a proper relation without the necessity of relying upon the tension placed on the parts of the windlass in an instance of load support.

Various changes in the shape, size, and arrangement of parts may be made to the form of invention herein shown and described, without departing from the spirit of the invention or the scope of the claims.

I claim:

1. In a windlass the combination of a frame having means at the upper end thereof to enable the pivotal mounting of the same, a drum rotatably supported at the lower end of the frame, said frame being laterally offset in one direction only, intermediate its ends with respect to a straight line drawn to intersect the axis of pivotal connection at the upper end of the frame and the pivotal connection of the drum, and a cable spirally wound upon the drum and having its one end secured to the drum and its free end hanging from the drum at the side thereof nearest the offset of the frame.

2. In a windlass, the combination of a frame including elongate upper and lower portions with their longitudinal axes in obtuse angular relation to each other, the upper frame portion having at its upper end means to enable pivotal mounting thereof, and a drum rotatably supported at the lower end of the lower portion of the frame, the longitudinal axis of the upper portion of the frame being approximately tangential to the drum.

3. In a windlass, the combination of a frame, a drum comprising a hub and spaced flanges defining a groove, a cable in said groove operatively engaging said hub to be moved lengthwise upon rotation of said drum and prevented from lateral displacement by said flanges, and means rotatably supporting the drum upon the frame at the hub thereof, one of said flanges being externally knurled and exposed laterally to each side of the frame to provide a hand wheel.

ROSSWELL W. THOMAS.